United States Patent [19]

Mekjian

[11] Patent Number: 4,535,146

[45] Date of Patent: Aug. 13, 1985

[54] POLYESTER FORMULATIONS HAVING FLEXIBILITY PROPERTIES

[75] Inventor: Aram Mekjian, Hillsdale, N.J.

[73] Assignee: United States Steel Corporation, Pittsburgh, Pa.

[21] Appl. No.: 607,983

[22] Filed: May 7, 1984

[51] Int. Cl.$^3$ .............................................. C08G 63/54
[52] U.S. Cl. ...................... 528/295.3; 524/601; 528/298; 528/306
[58] Field of Search .............. 524/601; 528/295.3, 528/298, 306

[56] References Cited

U.S. PATENT DOCUMENTS

| | | | |
|---|---|---|---|
| 3,674,727 | 7/1972 | Fekete et al. | 260/22 D |
| 3,876,582 | 4/1975 | Kaiser et al. | 260/75 UA |
| 4,029,848 | 6/1977 | Nelson | 428/430 |
| 4,148,765 | 4/1979 | Nelson | 260/22 CB |
| 4,233,432 | 11/1980 | Curtis, Jr. | 528/298 |
| 4,246,367 | 1/1981 | Curtis, Jr. | 525/49 |
| 4,309,519 | 1/1982 | Obara et al. | 528/306 X |
| 4,332,931 | 6/1982 | Hasegawa et al. | 528/304 X |
| 4,348,499 | 9/1982 | Nelson | 528/306 X |
| 4,360,634 | 11/1982 | Nelson | 528/306 X |

OTHER PUBLICATIONS

"Empol Dimer and Trimer Acids", 1979, Emery Industries, Inc. Booklet, p. 9.

Primary Examiner—Lucille M. Phynes
Attorney, Agent, or Firm—William L. Krayer

[57] ABSTRACT

Improved flexibility properties are provided in an unsaturated polyester resin comprising the esterification product of about 85 moles of maleic anhydride and a molar equivalent of water, about 10 to about 20 moles of a fatty acid dimer or trimer, about 65 to 125 moles of dicyclopentadiene, and about 50 to about 65 mole percent, based on the total of the maleic, dimer and trimer acids, of a glycol having 2–6 carbon atoms.

5 Claims, No Drawings

POLYESTER FORMULATIONS HAVING FLEXIBILITY PROPERTIES

BACKGROUND OF THE INVENTION

This invention relates to unsaturated polyester resins and particularly to unsaturated polyester resin formulations including significant amounts of both dicyclopentadiene and certain "dimer acids" which are more fully defined herein.

Many approaches have been employed to impart flexibility to unsaturated polyester resin formulations. For example, it is known to employ adipic acid in addition to or as a partial substitute for the commonly used phthalic or isophthalic acid, and that the adipic acid will result in enhanced resiliency for the finished product.

I am also aware that the particular dimeric and trimeric acids which I use in my invention have been used in unsaturated polyester resins—see page 9 of the 1979 Emery Industries Bulletin on "Empol" dimer and trimer additives, a copy of which is provided with the Prior Art Statement herewith; see also U.S. Pat. No. 3,674,727.

The use of dicyclopentadiene in unsaturated polyeser resin formulations has also increased considerably in recent years. See, for example, U.S. Pat. Nos. 4,029,848; 4,148,765; 4,233,432, and 4,246,367. DCPD, as it will hereafter be called, is not known, however, for its use in formulations designed for resiliency or flexibility.

SUMMARY OF THE INVENTION

My invention includes a method of making an unsaturated polyester resin comprising (1) heating together, for about forty to about 100 minutes at a temperature between about 100° and 120° C. a mixture of about 85 moles of maleic anhydride, about 10 to about 20 moles of a dimer or trimer of a fatty acid, about 15 to about 25 moles of DCPD, and about 84–90 moles of water, (2) adding to the reaction mixture an additional 60 to 100 moles of DCPD and continuing to maintain the reaction mixture for about 100 to about 140 minutes at temperatures between about 120° to about 140° C., and (3) adding to the reaction mass about 50 to about 65 mole percent, based on the total polycarboxylic acid content (hydrolyzed maleic anhydride, stearic acid dimer, and stearic acid trimer) of a glycol (preferably ethylene glycol) having 2 to 6 carbon atoms and 2–4 hydroxyl groups and maintaining the mixture at temperatures between about 190° and 212° C. for about 12 to about 20 hours.

A resin composition made in this manner with the recited ingredients will have excellent resiliency and flexibility properties. Some variations of the ingredients are permissible, however. For example, the dimer or trimer of stearic acid may quite acceptably be any of the commercial products made by the dimerization of stearic acid. Frequently this reaction will produce a certain amount of a trimer, in which it is assumed that the unsaturated ends of the hydrocarbon chains are linked, although it is not entirely certain exactly what form the linkage takes, even as the dimer. For my purpose, the reactants need not be stearic acid; any dimer or trimer of unsaturated fatty acids having from 15 to 21 carbon atoms may be used—this will result, of course, in the case of the dimer, in aliphatic chains of $C_{30}$–$C_{42}$, with side chains of variable length depending on the starting position of the unsaturation (generally the side chain length will not be greater than carbon atoms). The trimers may contain as many as 63 carbon atoms; the exact configuration of the linked portion of the chains is not known and is not critical in our invention. Typical commercial grades of the stearic acid form contain 3%, 4%, 13%, 17%, 22%, 25%, 80% and 90% tribasic acid, with the balance being dibasic with perhaps 1% or less of monobasic (unreacted) acid.

DCPD is formed at ambient conditions as the dimer of cyclopentadiene; thus use of the term DCPD is intended to include cyclopentadiene.

While ethylene glycol is preferred, it may be replaced partially or completely with other glycols such as propylene glycol, diethylene glycol, triethylene glycol and dipropylene glycol.

The compositions of my invention are not only flexible or resilient, but are eminently suitable for use in demanding environments such as the insides of transformers, which require high temperature stability and of course electrical resistivity.

A composition having the ingredients shown in column A of Table I was made according to the times and temperatures described above (specifically, the first step was 110° C. maximum for one hour, the second step was 140° C. maximum for two hours and the third step was 210° C. maximum for 15 hours).

TABLE I

|   |   | moles A | moles B | moles Control |
|---|---|---|---|---|
| 1 | Maleic Anhydride | 85 | 85 | 100 |
|   | Dimer Acid | 15 | — | — |
|   | Adipic Acid | — | 15 | — |
|   | DCPD | 20 | 20 | 20 |
|   | $H_2O$ | 86 | 86 | 101 |
| 2 | DCPD | 80 | 80 | 80 |
| 3 | EG | 60 | 60 | 60 |

Comparison was made with similarly prepared compositions having no high molecular weight diacid (control), and (column B) having the same amount of adipic acid as was used for dimer acid in the composition of our invention. The dimer acid used in the invention (column A) contained 17% trimer acid; EG is ethylene glycol. Vinyl toluene was added as a solvent monomer.

The wet and clear cast properties of the three compositions are shown in Table II.

TABLE II

|   | A | B | Control |
|---|---|---|---|
| Wet Properties | | | |
| Visc. RV #3 at 20 | 2030 cps | 2985 cps | 3150 cps |
| Acid Number | 6.3 | 6.9 | 8.3 |
| % Monomer (by wt) | 30.4 | 29.6 | 29.7 |
| Gel Time (SPI Test) | 9.7 min | 6.7 min | 7.3 min |
| Interval | 3.7 min | 1.9 min | 2.3 min |
| Peak Exotherm (°F.) | 268 | 343 | 353 |
| Clear Cast Physicals | | | |
| Flex. St. (PSI) | 4694 | 10822 | 9131 |
| Flex. Mod $\times 10^6$ | 0.0978 | 0.503 | 0.494 |
| Tensile St. (PSI) | 2020 | 4821 | 3704 |
| Tens. Mod. $\times 10^6$ (PSI) | 0.109 | 0.462 | 0.52 |
| Water Absorption | 0.116 | 0.128 | 0.12 |
| Elongation (%) | 12.32 | 1.16 | 0.79 |
| Barcol Hardness | 0 | 41 | 45.8 |
| Heat Distortion (°C.) | 40 | 72 | 85.5 |

The clear cast physical properties were collected by employing one part benzoyl peroxide to 100 parts of resin; the compound was cast between two glass plates and cured, without any filler, overnight at 120° C. The panel was then cut for testing the physical properties.

The flexibility and resiliency of our new composition is immediately run from the above data to be outstanding. The composition at the same time exhibits characteristics useful in certain high temperature environments where electrical resistivity is also important.

I claim:

1. Method of making an unsaturated polyester resin comprising (1) heating together, for about forty to about 100 minutes at a temperature between about 100° and 120° C. a mixture of about 85 moles of maleic anhydride, about 10 to about 20 moles of a dimer or trimer of a fatty acid having from 15 to 21 carbon atoms, about 15 to about 25 moles of dicyclopentadiene, and about 84–90 moles of water, (2) adding to the reaction mixture an additional 60 to 100 moles of dicyclopentadiene and continuing to maintain the reaction mixture for about 100 to about 140 minutes at temperatures between about 120° to about 140° C., and (d3) adding to the reaction mass about 50 to about 65 mole percent, based on the total polycarboxylic acid content (hydrolyzed maleic acid, fatty acid dimer, and fatty acid trimer) of a glycol having 2 to 6 carbon atoms and maintaining the mixture at temperatures between about 190° and 212° C. for about 12 to about 20 hours.

2. Method of claim 1 wherein the glycol is ethylene glycol.

3. Method of claim 1 wherein the fatty acid is stearic acid.

4. An unsaturated polyester resin comprising the esterification product of about 85 moles of maleic anhydride and a molar equivalent of water, about 10 to about 20 moles of a fatty acid dimer or trimer, about 65 to 125 moles of dicyclopentadiene, and about 50 to about 65 mole percent, based on the total of the maleic, dimer and trimer acids, of a glycol selected from ethylene glyocl, propylene glycol, diethylene glycol, triethylene glycol, and dipropylene glycol.

5. The unsaturated polyester resin of claim 4 wherein the dicyclopentadiene is present in an amount from about 80 to about 120 mole percent.

* * * * *